2,790,782

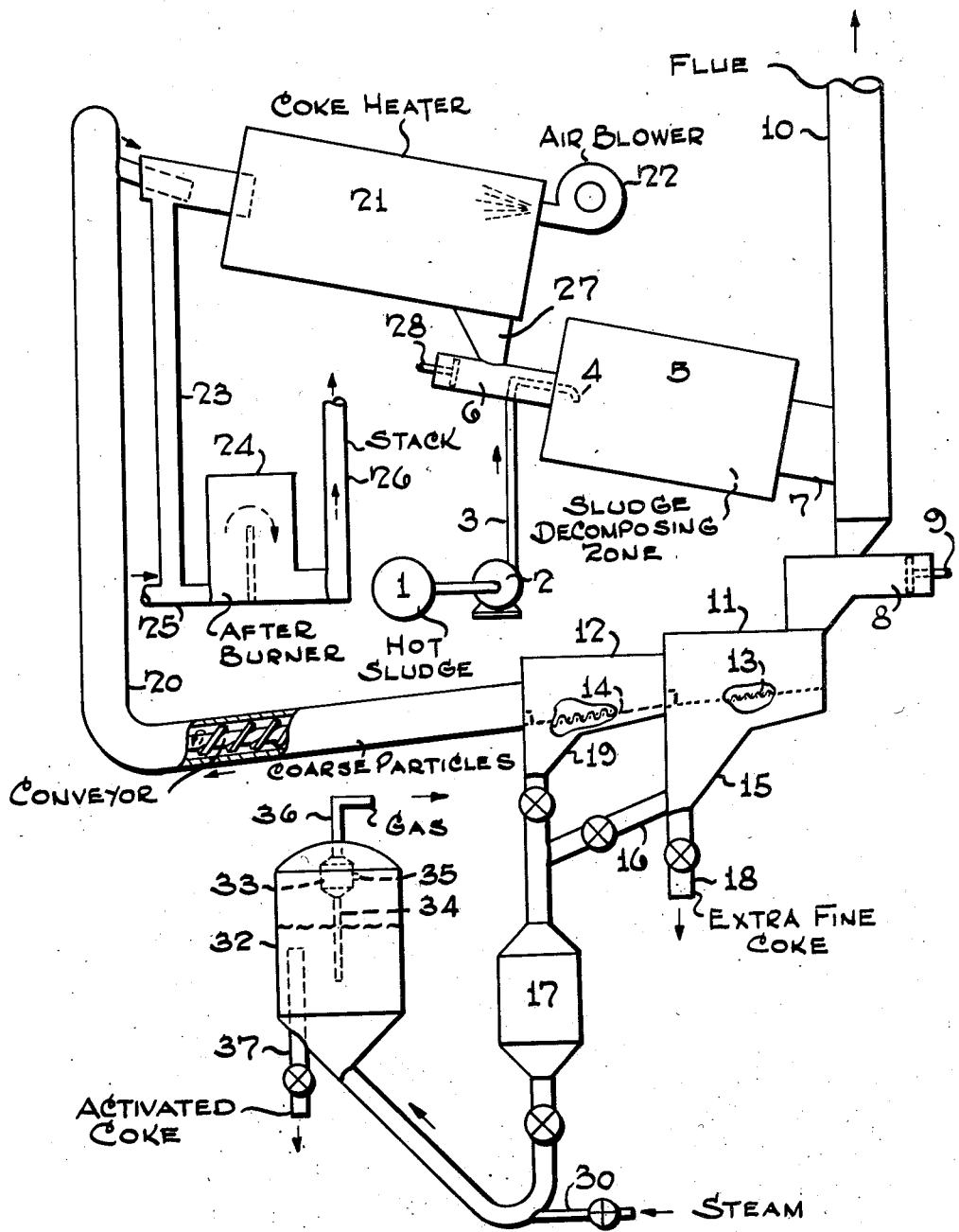

PRODUCTION OF ACTIVATED COKE FROM ACID SLUDGE

George O. Hillard, Jr., Baton Rouge, La., assignor to Esso Research and Engineering Company, a corporation of Delaware Application May 11, 1953, Serial No. 354,142

4 Claims. (Cl. 252—421)

The present invention points out certain control factors in the initial coking of petroleum acid sludge which affect the activation and activity. These coking factors include particularly the sulfur content and volatile matter of the coke prepared for activation.

This invention is based on the discovery of large variations in the activation properties of cokes formed by conventional methods of coking the petroleum acid sludges.

The ease and efficiency of activating acid sludge coke products could not be correlated to some particular properties of the coke when the coke batches were made in an uncontrolled or non-uniform manner. Now a definite connection of the activating efficiency to a combination of factors including high sulfur content and high volatile matter content is obtained by a procedure for controlling these factors.

Procedural steps used for controlling the uniformity and extent of coking the acid sludge include the following:

(a) To decompose the sludge in a uniform manner to a desired extent, the sludge is made to coat hot coke particles entering a decomposing zone at a fixed temperature above 400° C. (750° F.–1200° F.) and continuously traveling through said zone at a constant regulated rate.

(b) The volatile matter and/or sulfur content of the coke particles discharged from the sludge decomposing zone can be analyzed to determine the rate of coking.

(c) The sludge coke particles are screened or classified according to size to determine which particles are to be subjected directly to activation with steam or other activating gas. The coarse particles are employed for reheating, e. g. by partial oxidation, to supply the hot coke particles introduced continuously into the sludge decomposing zone.

Systems proposed in the past for coking acid sludges have been defective for controlling the extent and uniformity of coking. For instance, if no effort is made to control the size of particles passed into a sludge coking zone and if the materials in the coking zone are subjected to a turbulent mixing which causes repeated sludge deposition on some particles and excessive calcination of others, the required control cannot be obtained.

The procedural steps of the present invention may be employed with conventional rotary kiln and conveying apparatus or with fluidized solid apparatus adapted for the steps described. In moving a suspension of coke particles through the coking zone, the sludge should be deposited on the coke introduced at one end of the zone and the sludge coated coke should be moved continuously toward the discharge end of the coking zone for removal therefrom.

In the attached drawing is illustrated a flow plan of steps and means for coking acid sludge and activating a selected coke product.

The hot petroleum acid sludge is pumped from tank 1 by pump 2 through feed line 3 to be sprayed by nozzle 4 into an inlet end of rotary kiln 5.

Kiln 5 is where the acid sludge is decomposed as it forms a coating on recycled hot coke particles. In this sludge decomposer, the acid sludge preheated to about 150° C.–270° C. (300° F. to 500° F.) forms a coating on the hot carbon particles entering at inlet 6.

At the outlet end 7 of kiln 5, the acid sludge coating is carbonized on the recycled hot coke particles. Here the coke particles are dropped into a removal means, such as the chamber 8 fitted with a reciprocating plunger 9.

Volatile materials including water vapor and sulfur-containing compounds, e. g., S vapor, $SO_2$, and $SO_3$ are removed at this outlet end up through flue 10 to a sulfuric acid recovery unit (not shown).

The coked acid sludge particles vary in size. Variations in size take place with changes in the size and amounts of each size recycled. Also, variations in size of coke particles will take place with changes in combustion of recycled particles, proportions of sludge coked on the particles and extent of coking.

For obtaining a certain uniformity of size, the coked products are discharged from chamber 8 into a classifying system represented by screening chambers 11 and 12. A number of such chambers equipped with vibrating screen 13 and 14 may be used.

With the classifying system shown, fine screen 13 of about 80 mesh allows the finest particles to be shaken through. These finest particles collect in hopper 15.

A high proportion of the finest particles may be allowed to flow by line 16 down into the product collecting vessel 17. Some of the finest particles may be discarded through pipe 18.

In chamber 12 the major part of the coke particles should pass through screen 14 which is of about 10 to 14 mesh. The intermediate size particles which pass through screen 14 are collected in hopper 19 and flow downwardly into the coke product collecting vessel 17. These intermediate particles should constitute between about 50 and 70% of the total coke product which is subjected to the screening. The coarsest particles which are retained on screen 14 are conveyed by any suitable conveying means 20 back into the inlet of the coke combustion and heating kiln 21. Conveying means may include moving belts, moving bucket means, or means equipped for fluidization of the coke particle.

Kiln 21 has a hot air blower 22 at its outlet end. The hot air is blown countercurrent to the flow of the coke in kiln 21 to cause partial combustion of the coke particles. Any very fine particles present in kiln 21 are burned completely. The air supply to kiln 21 is controlled to bring the coke to a temperature in the range of about 400° C. to 650° C. (750° F.–1200° F.). The kiln may be equipped with other additional heating means not shown, for example, external heating means, or with means for supplying hot combustion gases. The gaseous products are swept out of the upper end of kiln 21 to be removed through duct 23 to a combustion chamber 24 where combustion is completed by addition of air from line 25. Flue gases are removed through flue 26 from the combustion chamber 24. The heated coke leaves the lower end of kiln 21 through passage 27 into chamber 6. Chamber 6 is equipped with a means, such as plunger 28 for moving the hot coke particles into inlet end of the sludge decomposing kiln 5 where the cycle is repeated.

The acid sludges to be coked are residual products of various petroleum refining operations, e. g. sulfuric acid treatment of gasoline, of higher boiling distillates, and mainly from sulfuric acid or oleum treatment of phenol extracted oils in the lubricating oil range for the manufacture of white oils and petroleum sulfonates. The aqueous acid residues may vary in character depending upon the severity of the acid treatments, but, in general, these acid residues form a tarry residue or sludge upon settling and this sludge is a heterogeneous mixture of carbonaceous materials including sulfonic acids and sulfur derivatives.

The tarry sludge is carbonized in kiln 5 on being contacted with the hot particles therein at temperatures of about 400° C. to 650° C. (750° F. to 1200° F.) on the average at the inlet end. As the coated particles are moved toward the discharge end 7, they become cooled to a temperature of about 100° C. to 350° C. (212° to 660° F.). The decomposition of the sludge to the extent that the residual sludge coke has a volatile matter content (at 1000° F.) of 10 to 25% takes about 10 to 20 minutes.

The classified fine sludge coke product ready for activation is in a form that it can be easily fluidized in a stream of hot steam from line 30 to be injected through line 31 into activation chamber 32. Chamber 32 may be equpped with a dust separator, such as cyclone 33 with dip leg 34, inlet 35 and gas outlet 36. Activated coke product may be withdrawn by line 37.

Variations in the raw coke products from acid sludge are shown in the analysis given in the following table:

ANALYSIS OF ACID SLUDGE COKE PRODUCTS PRIOR TO ACTIVATION

|  | Batches | | | |
| --- | --- | --- | --- | --- |
|  | #3A | #3B | #4A | #4C |
| Ash, Wt. Percent | .21 | .32 | .38 | .39 |
| Sulfur, Wt. Percent | 5.60 | 5.44 | 7.50 | 6.65 |
| Volatile Matter at 1,000° F., Percent | 6.70 | 8.90 | 13.7 | 20.6 |
| Screen Analyses: Retained— | | | | |
| On 14 mesh | 57 | 37 | 30 | 18 |
| On 20 mesh | 75 | 55 | 52 | 33 |
| On 35 mesh | 92 | 77 | 77 | 51 |
| On 60 mesh | 98 | 89 | 89 | 62 |
| On 80 mesh | 99 | 94 | 95 | 70 |
| Through 80 mesh | 1 | 6 | 5 | 30 |

A comparison of the 4 batches shows that the last two batches (#4A and #4C) have high sulfur and volatile matter contents. The high S and volatile matter contents can be attributed to a lessened coking treatment of the particles which are mainly finer than 14 or 20 mesh.

The different batches of raw and sludge coke were activated under comparative conditions, then tested for adsorption activity for adsorbing propane and ethylene.

In general, each batch of coke was activated to yields of 45–60% of carbon under the following conditions:

Table I

Average coke bed temperature _____ ° F__ 1500–1600
Average steam rate__lb./hr./100 lbs. charged__ 30–50

Significant differences were found in the rate of activation or ease of activation and activities of the different batches.

Table II

|  | Batches | |
| --- | --- | --- |
|  | #3 | #4 |
| Average Activation Holding Time, Minutes | 165 | 135 |
| Propane Adsorption Activity,[1] Percent | 100 | 110 |
| Ethene Adsorption Activity,[1] Percent | 97 | 99 |

[1] General average at 52% active carbon yield compared to commercial coconut char activity.

The #4 batches, which represent the improved acid sludge coke for activation required less time for activation and yielded a more active product than the #3 batches which represent acid sludge cokes that were not made with all the controls afforded by applicant's process. While the differences in activity appear small there is considerable advantage in producing a coke with this additional activity at a much lower activation time. The additional activity obtained assures a coke equal to or better than the coconut chars.

Although known activating conditions may be used for activating the high sulfur and high volatile matter cokes, for example, temperatures in the range of 700° C. to 900° C. using various activating gases, such as steam and/or carbon dioxide, these cokes are well adapted for the extremely high temperature activation, i. e., 800° C. to 900° C. activation with high flow rates of the activating gas. The extent of activation can be determined by the amount of coke consumed on the yield of activated carbon. In general, the yield of activated carbon will amount to 40 to 90 weight percent of the coke, but a desired high activity is obtained when the yield is in the range of 45 to 60 weight percent.

To obtain a uniformly restricted amount of decomposition of the acid sludge, the hot sludge is supplied onto the much hotter coke particles as they enter and pass through a spraying section of the decomposition zone at 400° C. to 650° C. Then the coated coke particles are continuously removed through the remaining part of the decomposition zone wherein they are gradually cooled to a lower temperature of about 350° C. to 100° C. In this manner there is an avoidance of excessive treatment of the coke particles at a high decomposition temperature. The rate at which the coke particles should be moved continuously through the spraying area or section and through the remainder of the decomposition zone is determined by the amount of volatile matter and sulfur content retained by the coke.

The properties of the activated acid sludge cokes having different sulfur and volatile matter contents were correlated and the existence of fundamental differences in the cokes was confirmed.

The activities or the capacities of the cokes for adsorbing propane were compared with the yields of the activated cokes. For a given yield the propane capacity was found to be greater for the activated product formed from a coke having the higher sulfur and volatile matter content, particularly when the sulfur content was above 6.5 weight percent and the volatile matter content was above 10 weight percent. On an average, for the same propane adsorption activity the activated coke formed from an acid sludge coke having above 6.5 weight percent sulfur was obtained in about 20% greater yield which is a substantial saving. This difference in yield for a given activity in treating the low sulfur content acid sludge coke #3 and #4 is illustrated in the following data:

Table III

COMPARISON OF ACTIVITY-YIELD RELATION FOR BATCHES #3 AND #4

| Activity | #3 (5.4 to 5.6 wt. Percent S) | | #4 (6.5 to 8 wt. Percent S) | |
| --- | --- | --- | --- | --- |
| Propane Adsorption | 103 | 106 | 103 | 107 |
| Yield, percent | 51 | 48 | 59 | 54 |

Similarly, in other tests it was shown that the propane adsorption capacity of the higher sulfur content coke #4 (6.5 to 8 wt. percent S) higher than the capacity for the #3 activated coke and the yields which were about 10 to 20% higher.

It was also determined that with the substantially greater reduction of sulfur content in the higher sulfur-containing coke #4 there was a corresponding increase in the surface area. In other words, for a given sulfur content the #4 coke had a greater amount of surface than did the #3 coke.

What is claimed is:

1. A process for preparing activated carbon from petroleum acid sludge which is a mixture of carbonaceous materials including sulfonic acids and sulfur derivatives from a sulfuric acid treatment of petroleum distillates, which comprises supplying hot coke particles at temperatures above 400° C. to a sludge decomposition zone, coating said hot coke particles with said petroleum acid sludge preheated to a temperature of about 150° to 270° C., agitating the coke particles as they are coated with the sludge, distilling volatile substances from the sludge coating of the coke particles as these particles are moved toward an outlet of the decomposition zone at a rate such as to leave the particles with a coked coating of the sludge retaining from 10 to 20% of matter volatile, measured at 1000° F., and 6.5 to 8 wt. percent sulfur as they are discharged from the decomposition zone, and activating coke particles discharged from acid decomposition zone by contact with steam at 800° C. to 900° C. until about 45 to 60% of the coke remains as activated carbon particles.

2. A process for preparing activated carbon from petroleum acid sludge which is a mixture of carbonaceous materials including sulfonic acids and sulfur derivatives from a sulfuric acid treatment of petroleum distillates, which comprises supplying hot coke particles to a sludge spraying section of a decomposition zone, coating said hot coke particles with the petroleum acid sludge as the coke particles are moved through the sludge spraying section at 400° C. to 650° C. into a cooler part of the decomposition zone, continuously removing the sludge coated coke particles through the decomposition zone at a rate such as to leave the coke particles retaining from 10 to 20% of volatile matter measured at 1000° F. and about 6.5 to 8 weight percent of sulfur, cooling the coke particles as they pass through the decomposition zone down to a temperature in the range of 350° C. to 100° C., and activating coke particles discharged from said decomposition zone by contact with steam at 700° C. to 900° C. until about 40 to 90 weight percent of the coke remains as activated carbon products.

3. A process for preparing activated carbon having a high adsorption capacity for propane, which comprises supplying hot coke particles at a temperature above 400° C. to a decomposition zone, coating said hot coke particles with petroleum acid sludge which is a mixture of carbonaceous materials including sulfonic acids and sulfur derivatives from a sulfuric acid treatment of a petroleum distillate, and simultaneously moving the hot coke particles coated with said sludge through said decomposition zone in a period of less than 10 minutes so as to leave carbonized sludge coated coke particles retaining from 10 to 20% of volatile matter measured at 1000° F. and about 6.5 to 8 weight percent of sulfur, promptly cooling the coated coke particles as they pass through said decomposition zone to a temperature in the range of 350° to 100° C., then activating the resulting coke particles by contact with steam at 700° C. to 900° C. in a period of less than about 150 minutes.

4. A process for preparing activated carbon having a high adsorption capacity for propane from petroleum acid sludge which is a mixture of carbonaceous materials including sulfonic acids and sulfur derivatives from a sulfuric acid treatment of a petroleum distillate, which comprises supplying recycled hot coke particles of the sludge at temperatures above 400° C. to the inlet of a sludge decomposition zone, coating said hot coke particles as they are moved from said inlet toward the outlet of said sludge decomposition zone with said petroleum acid sludge, agitating the coke particles as they are coated with the sludge, distilling volatile substances from the sludge coated coke particles as these particles are moved toward the outlet of the decomposition zone at a rate sufficient to leave the coke particles retaining a volatile matter content of 10 to 20% measured at 1000° F. and 6.5 to 8 weight percent sulfur upon being discharged from the outlet of the decomposition zone, classifying the resulting coke particles discharged from said decomposition zone to separate said coarse particles which are recycled, and activating the classified finer particles by contact with an activating gas selected from the group consisting of steam and carbon dioxide at temperatures of 700° to 900° C. until 40 to 90 weight percent of the coke remains as activated coke particles.

References Cited in the file of this patent

UNITED STATES PATENTS

| | | |
|---|---|---|
| 2,342,862 | Hemminger | Feb. 29, 1944 |
| 2,393,214 | Andrews | Jan. 15, 1946 |
| 2,405,206 | Goss et al. | Aug. 6, 1946 |
| 2,412,667 | Arveson | Dec. 17, 1946 |
| 2,448,337 | Wickenden | Aug. 31, 1948 |
| 2,586,889 | Vesterdal et al. | Feb. 26, 1952 |